Figure 1:
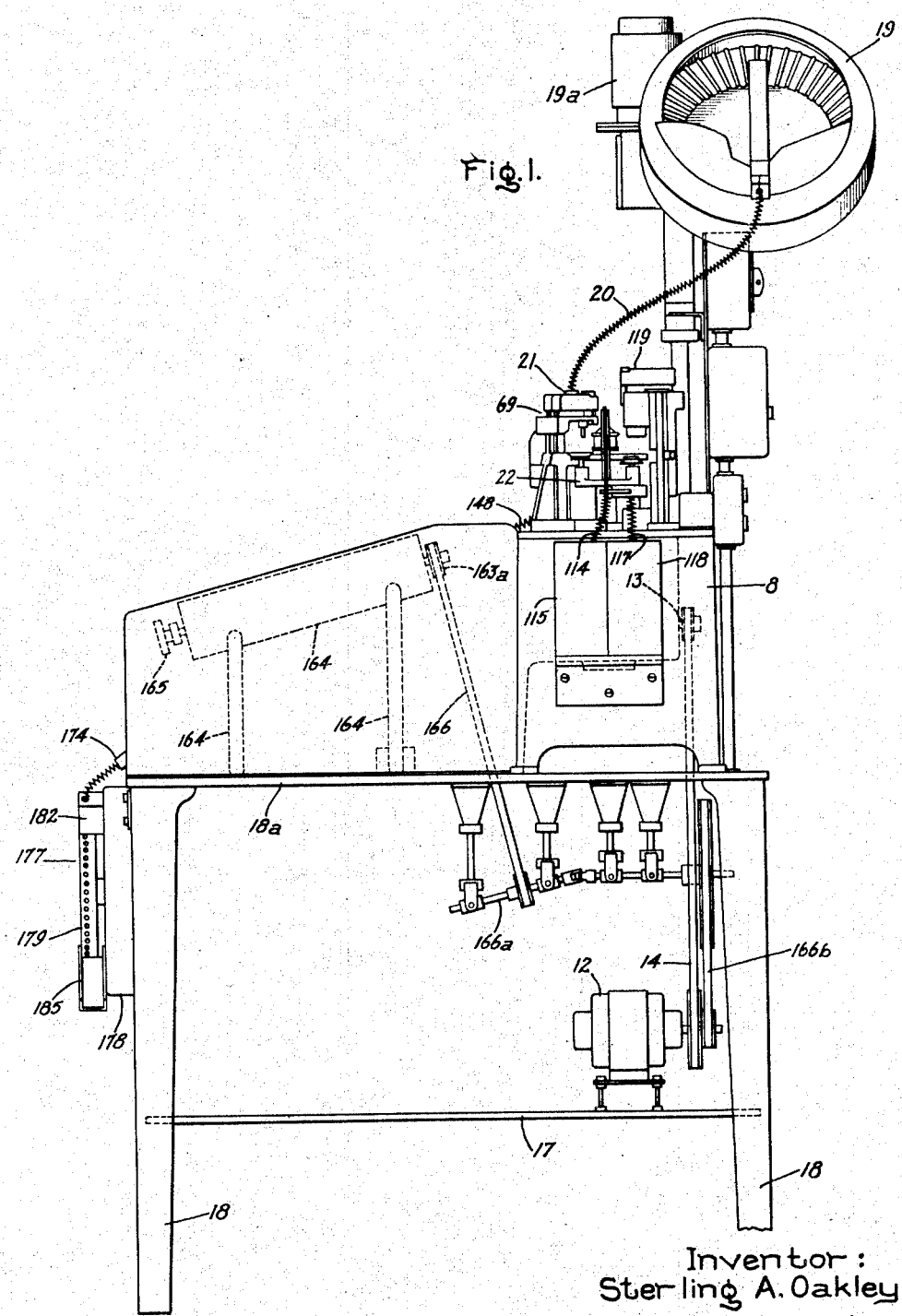

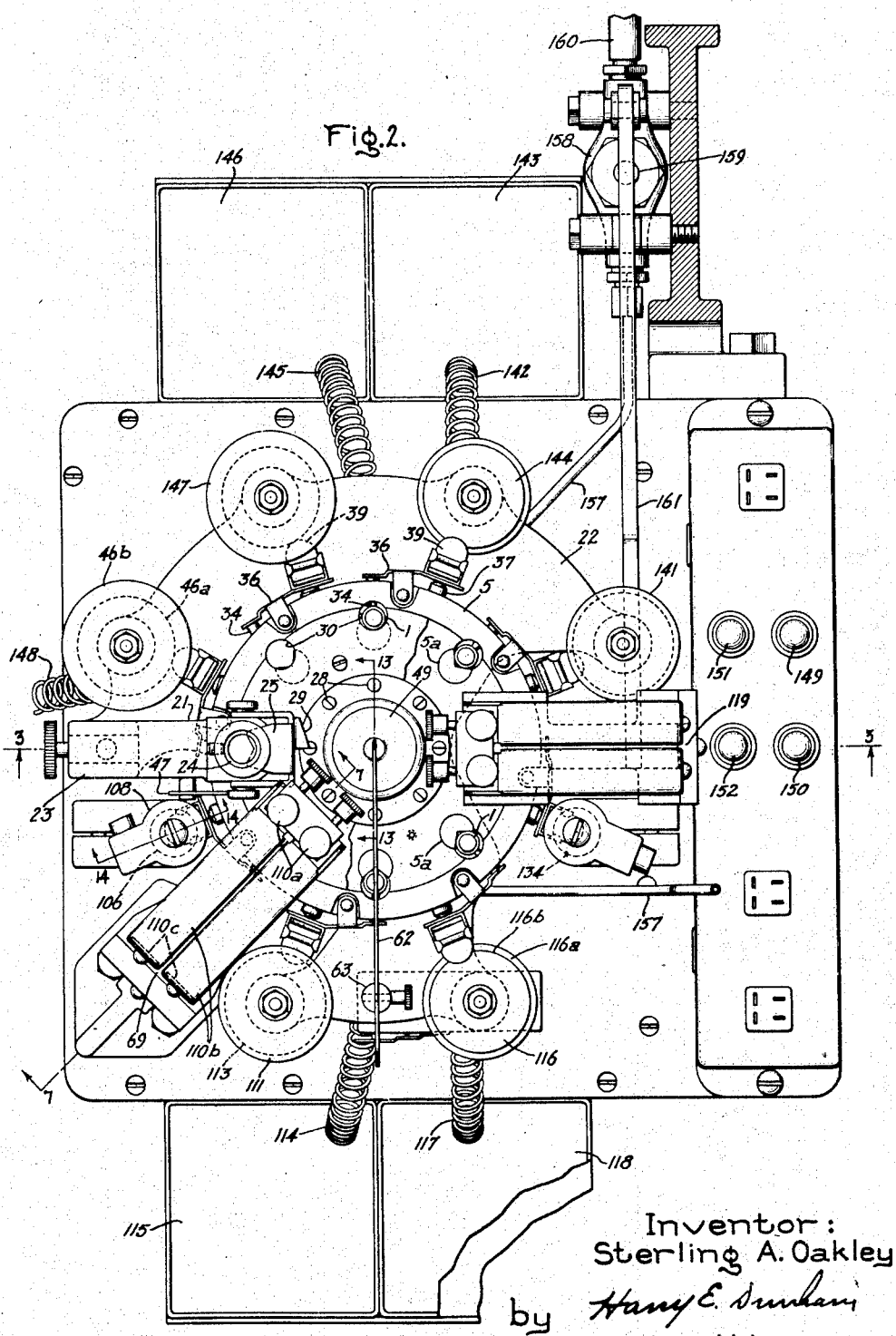

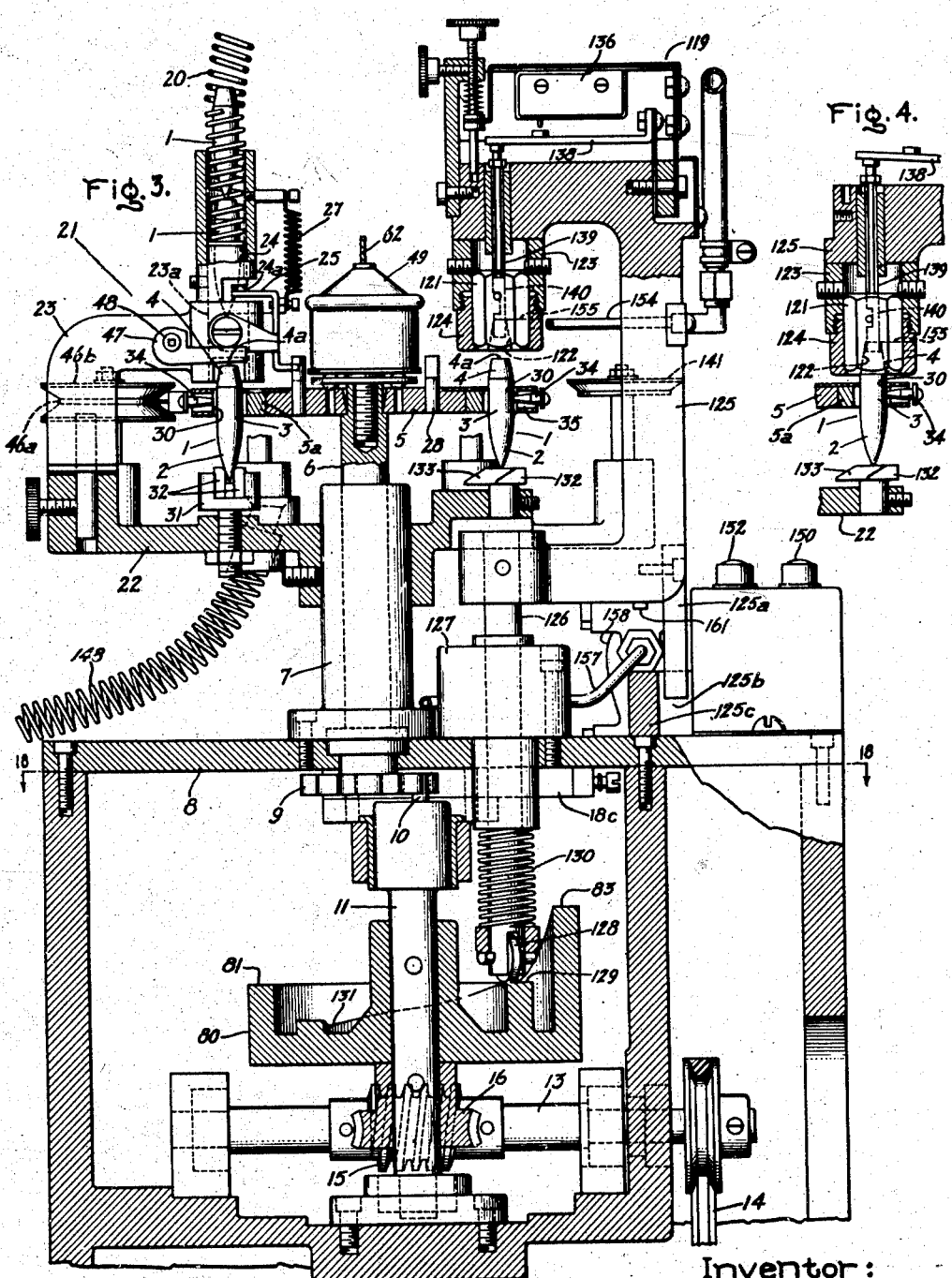

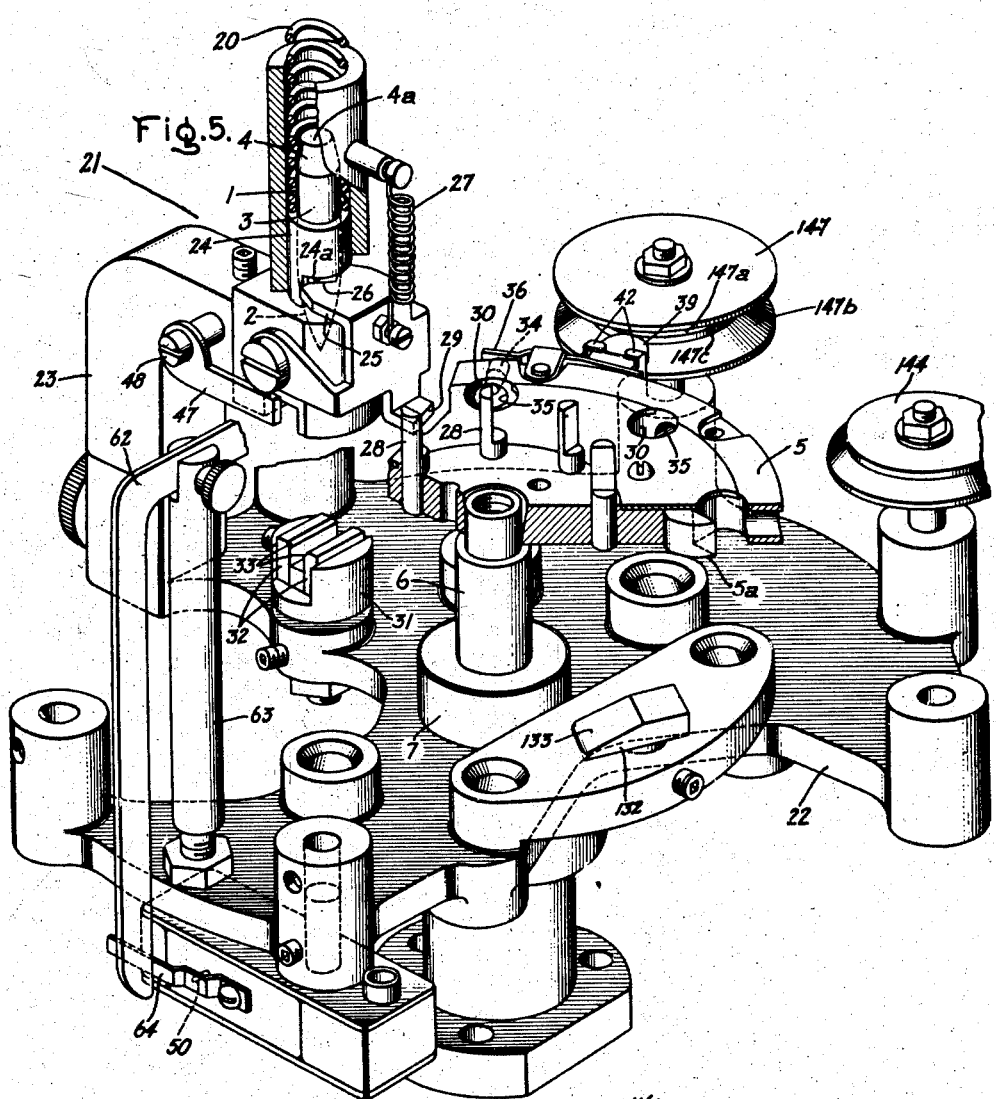

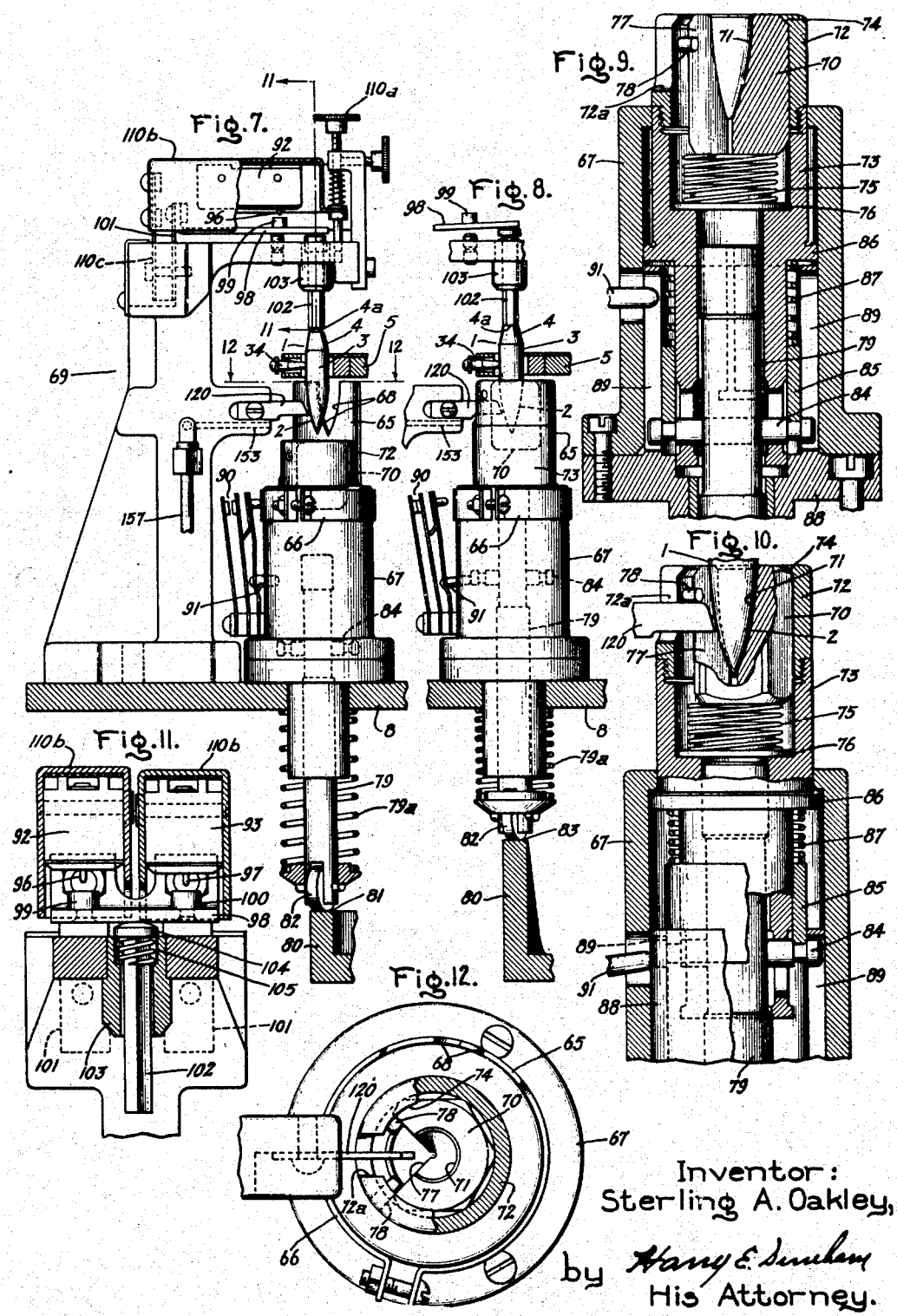

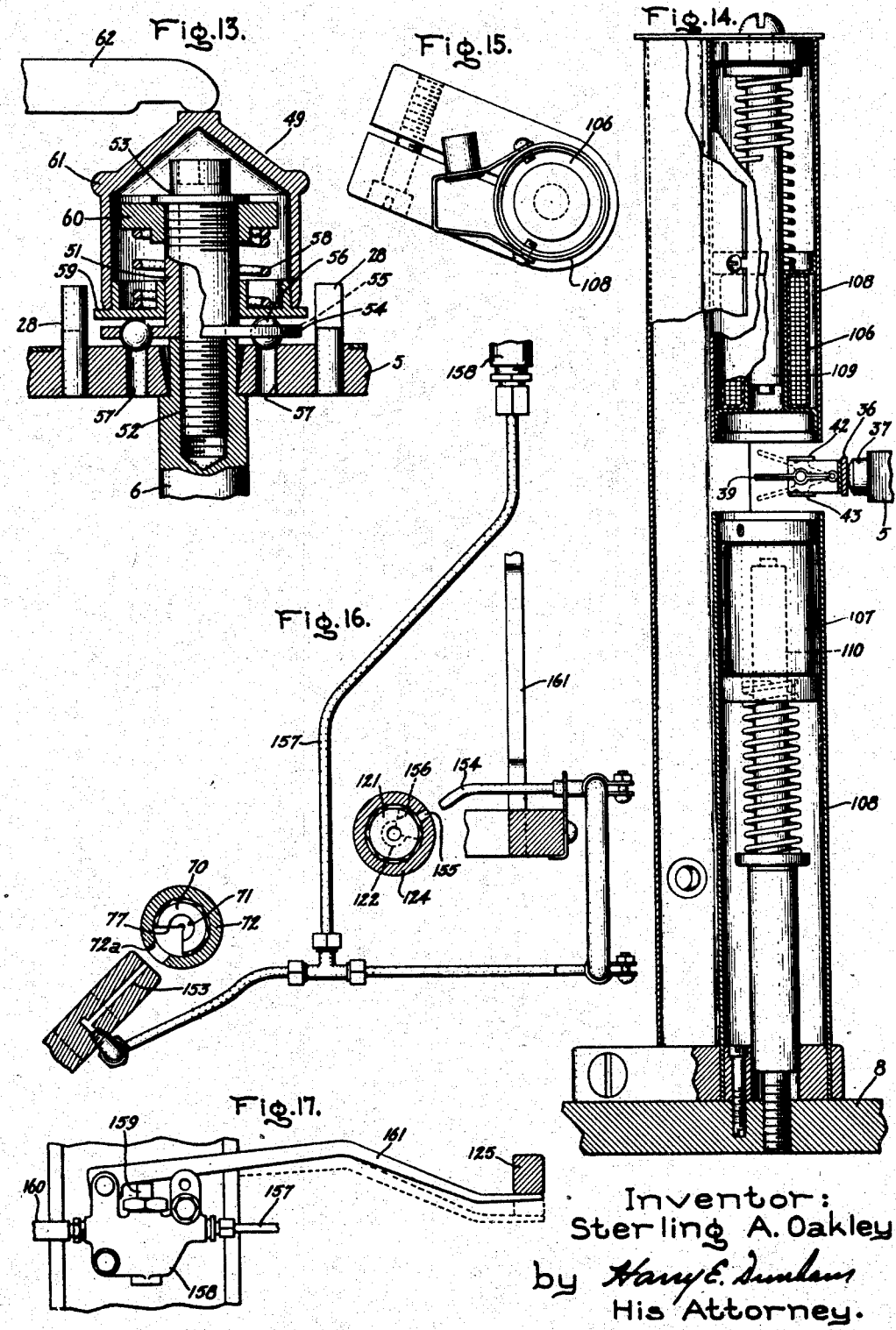

June 10, 1947.  S. A. OAKLEY  2,422,036
APPARATUS FOR GAGING AND ASSORTING BULLET CORES
ACCORDING TO SIZE AND SHAPE
Filed Sept. 30, 1944  11 Sheets-Sheet 7

Inventor:
Sterling A. Oakley,
by Harry E. Dunham
His Attorney.

June 10, 1947.  S. A. OAKLEY  2,422,036
APPARATUS FOR GAGING AND ASSORTING BULLET CORES
ACCORDING TO SIZE AND SHAPE
Filed Sept. 30, 1944    11 Sheets-Sheet 8

Inventor:
Sterling A. Oakley.
by Harry E. Dunham
His Attorney.

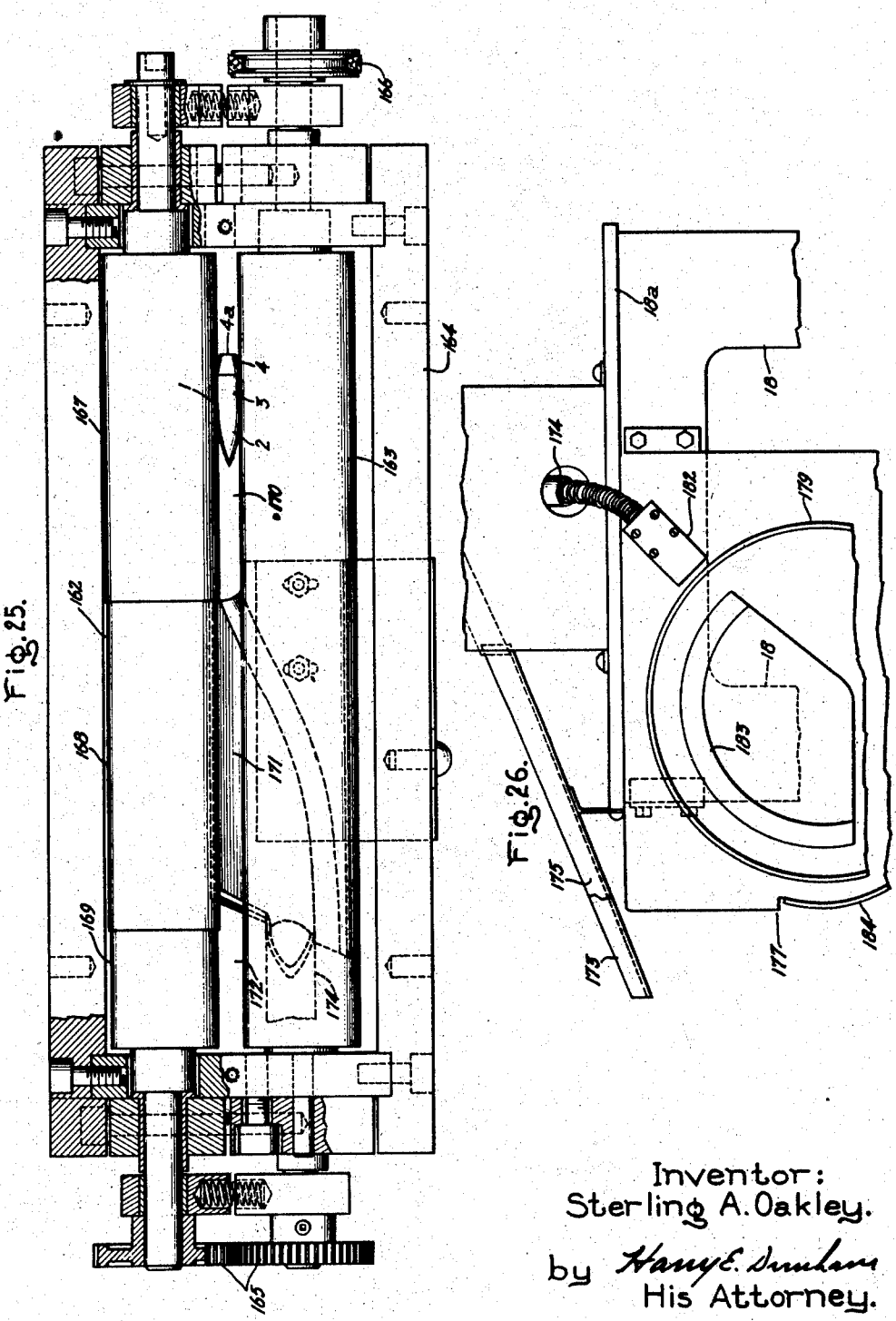

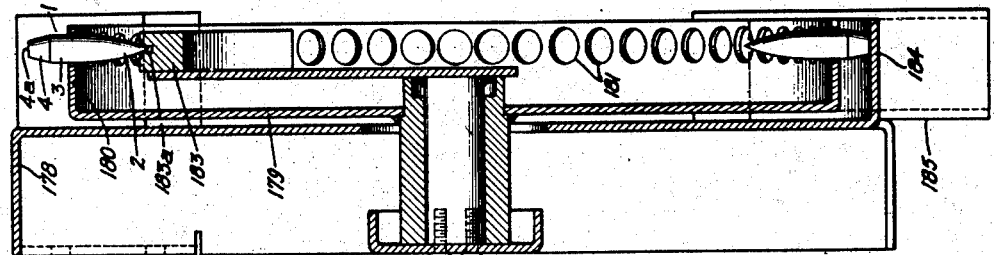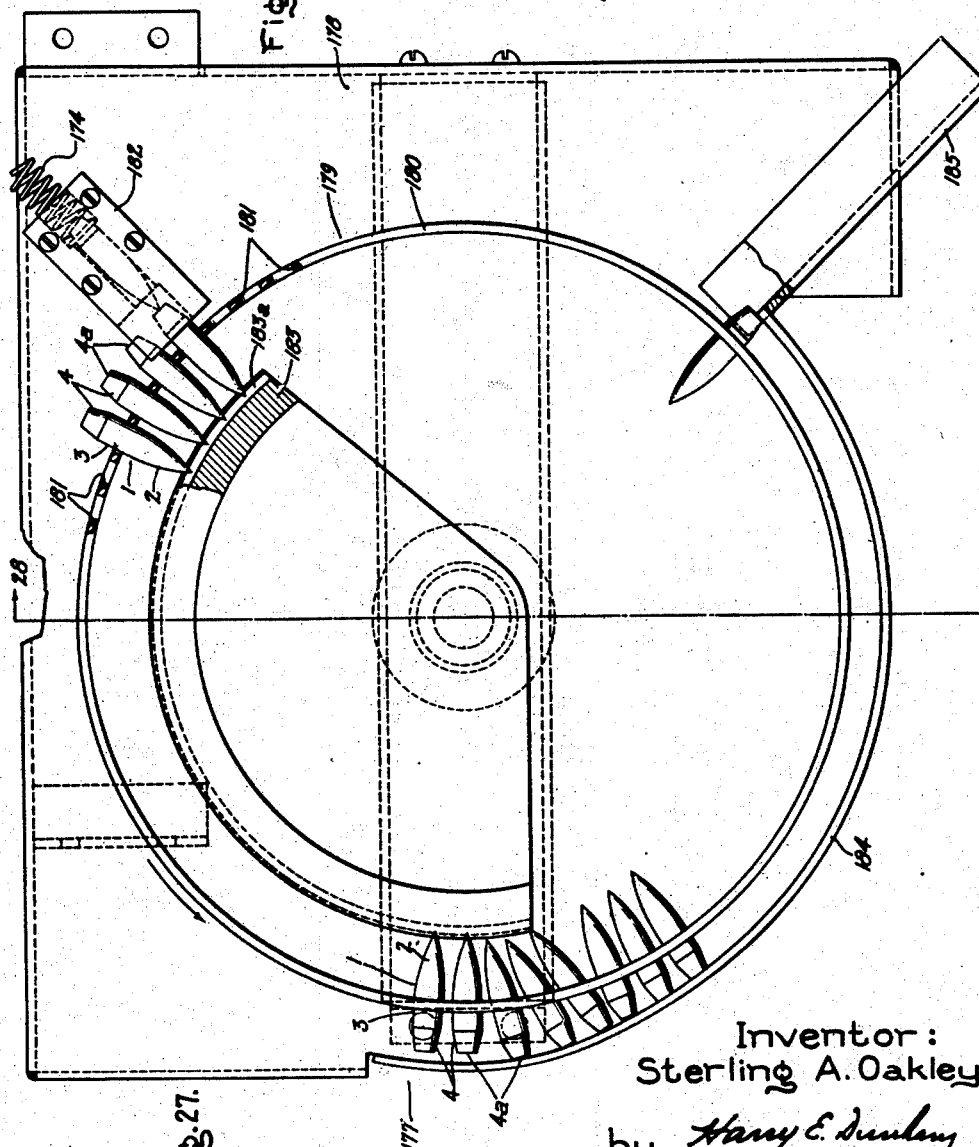

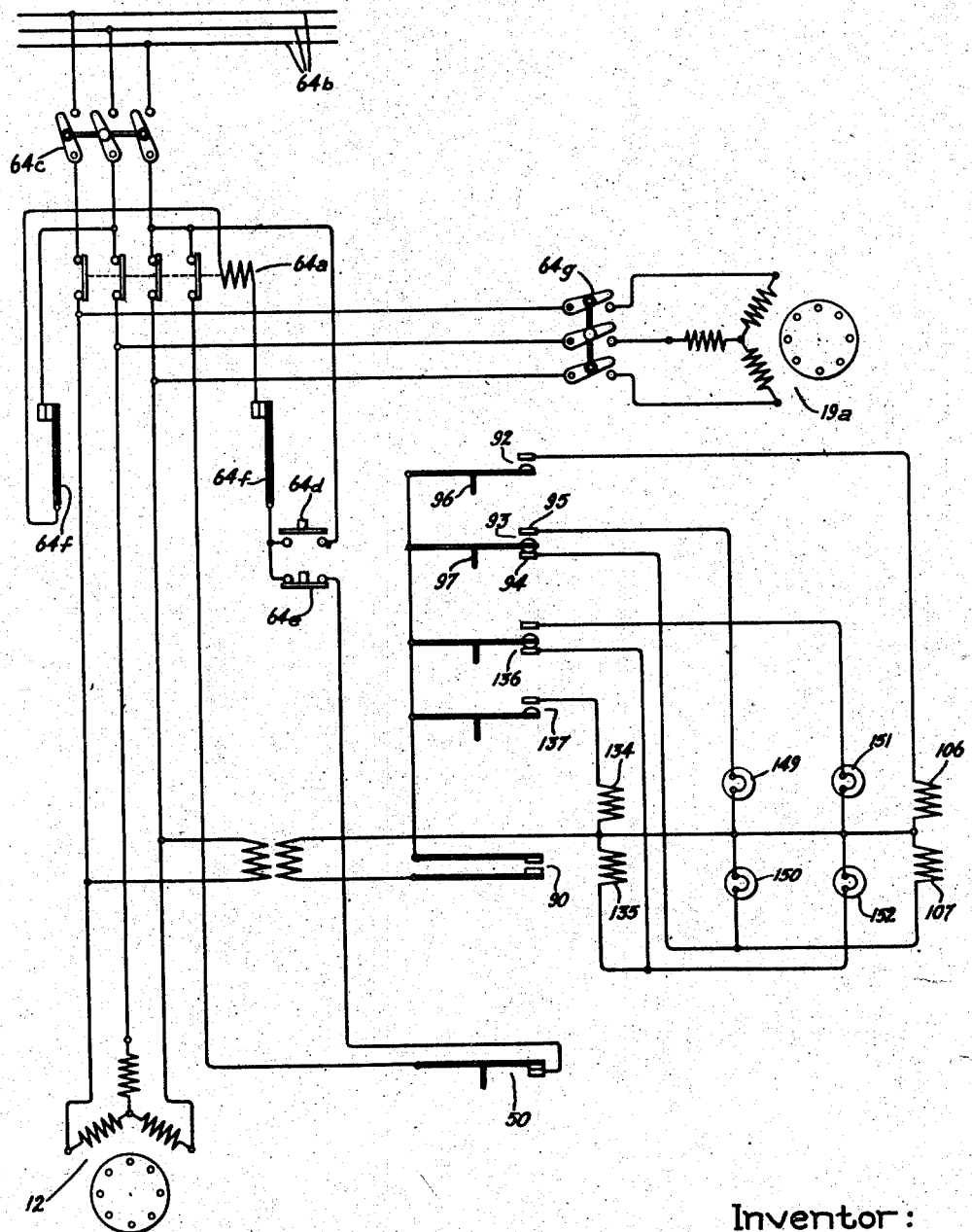

Patented June 10, 1947

2,422,036

UNITED STATES PATENT OFFICE 2,422,036

APPARATUS FOR GAGING AND ASSORTING BULLET CORES ACCORDING TO SIZE AND SHAPE

Sterling A. Oakley, Lincolnwood, Ill., assignor to Hotpoint Inc., a corporation of New York Application September 30, 1944, Serial No. 556,619

10 Claims. (Cl. 209—75)

This invention relates to apparatus for testing the hardened cores of machine gun bullets, and it has for its object the provision of improved apparatus of this character which automatically performs all the necessary gauging operations for the cores, including a station providing for the visual inspection thereof.

In the United States Ordnance method of gauging there are provided two master gauge blocks—one for the ogive end of the core and the other for the boat-tail end of the core. There also is a master core which has the proper shape and dimensions. When the master core is placed in the two gauges respectively, two associated indicating gauges are set to zero. Then, the manufactured cores are manually placed one at a time first in one of the gauges, for example, the ogive gauge, and the indicator read, and then it is placed in the other gauge and that indicator read. If the gauges both read within permissible tolerances the core is passed. If either gauge reads outside these tolerances, the core is rejected. When millions of cores are being manufactured, as at the present time, the manual work required to gauge the cores is tremendous.

This invention contemplates the provision of apparatus for automatically performing the gauging of the ogive and boat-tail ends and the diameters of the cores, and for progressively eliminating such cores as do not pass any of the gauging tests satisfactorily. Cores having the same faults in common, namely, short ogive, long ogive, short boat-tail and long boat-tail, under-size or over-size diameter are separated from each other, and preferably directed into separate bins.

A core after satisfactorily passing the ogive end, boat-tail end and diameter tests is directed into a visual inspection station.

At this station, holder means are provided for holding the cores for ready inspection by the operator who manually removes those whose ogive and boat-tail surfaces are not smooth enough to pass inspection due to deep tool marks or other irregularities.

Also, the apparatus includes a profile station which consists of a pair of profile plates which gauge the profile of the flat boat-tail end surface and of the ogive end, and in the event either of these surfaces is radically-shaped, the apparatus is shut down before such a core is allowed to reach the first gauging station.

Figure 18:
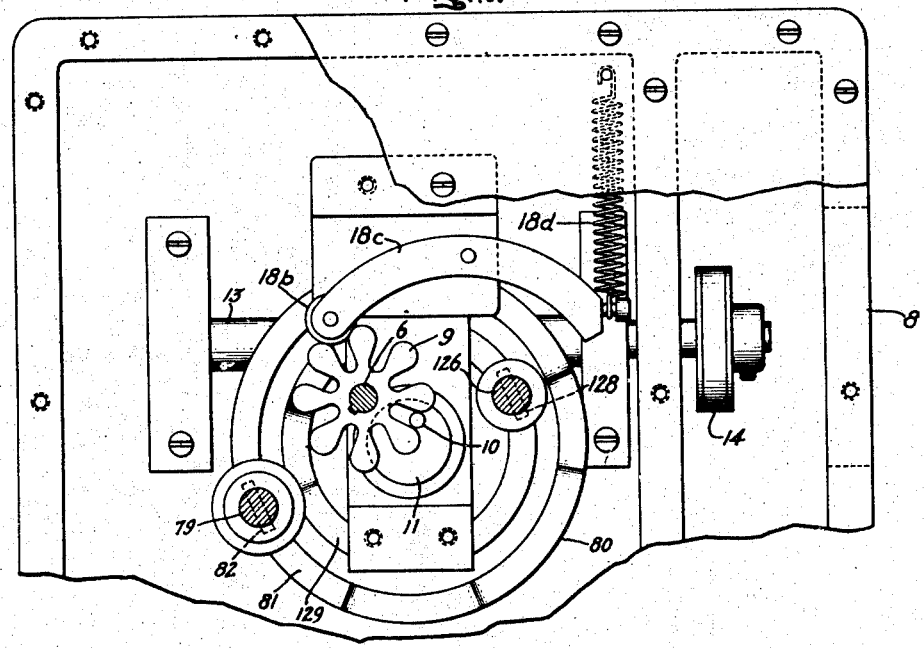
Figure 20:
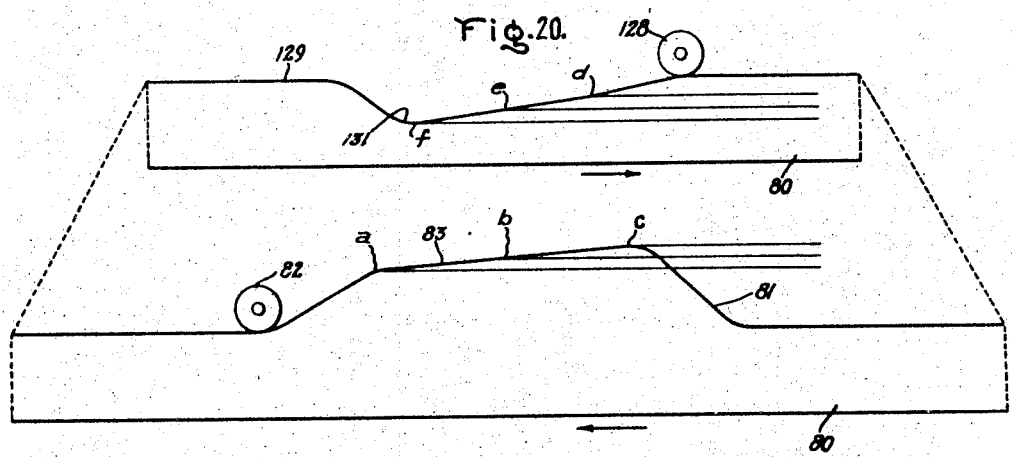
Figure 19:
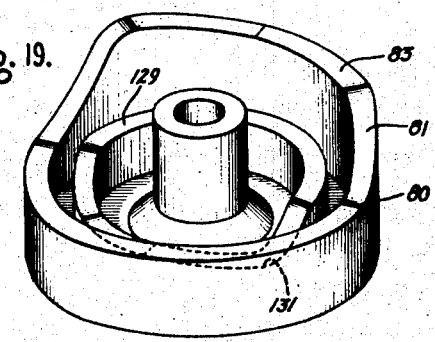
Figure 21:
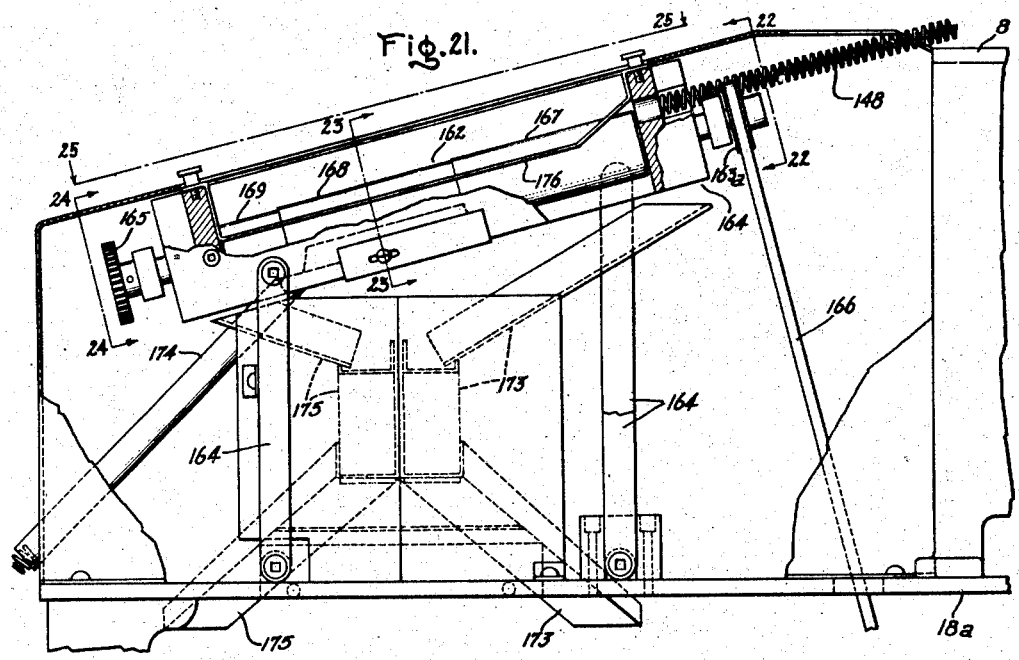
Figure 22:
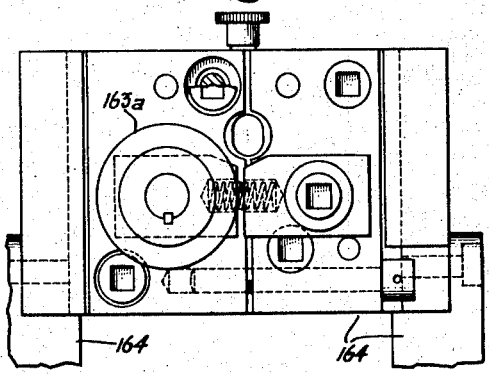
Figure 23:
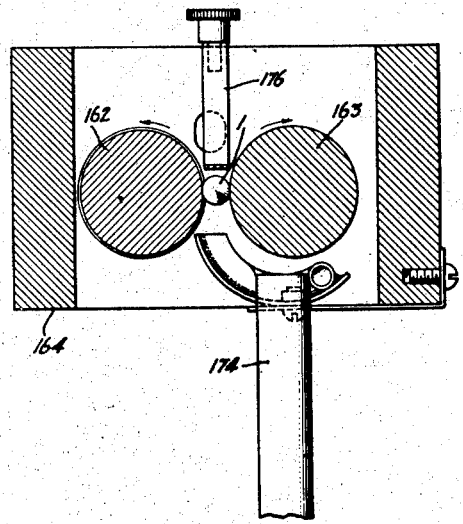
Figure 24:
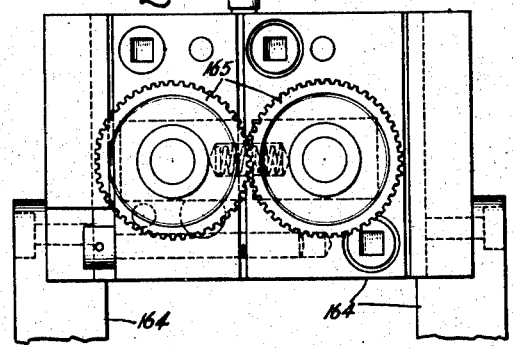

For a more complete understanding of this invention, reference should be had to the accompanying drawings in which Fig. 1 is a front elevation of core testing apparatus embodying this invention; Fig. 2 is an enlarged plan view of a portion of the apparatus shown in Fig. 1; Fig. 3 is a vertical sectional view taken through the line 3—3 of Fig. 2, and looking in the direction of the arrows; Fig. 4 is a vertical sectional view of a portion of the apparatus shown in Fig. 3, but illustrating certain elements in different operative positions; Fig. 5 is a perspective view of a certain portion of this core testing apparatus; Fig. 5a is a diagrammatic view illustrating certain core releasing means used in this apparatus; Fig. 6 is a fragmentary plan view of a portion of the core testing apparatus, parts being shown in section so as to illustrate certain details of construction; Fig. 7 is a vertical sectional view taken through the line 7—7 of Fig. 2, and looking in the direction of the arrows; Fig. 8 is a fragmentary view similar to Fig. 7, but illustrating certain portions of the mechanism in different operative positions; Fig. 9 is an enlarged vertical sectional view taken through parts of the apparatus shown in Figs. 7 and 8; Fig. 10 is a view similar to Fig. 9 but illustrating certain elements in different operative positions; Fig. 11 is an enlarged vertical sectional view taken through the line 11—11 of Fig. 7 and looking in the direction of the arrows; Fig. 12 is a horizontal sectional view taken through the line 12—12 of Fig. 7 and looking in the direction of the arrows; Fig. 13 is an enlarged vertical sectional view taken through the line 13—13 of Fig. 2 and looking in the direction of the arrows; Fig. 14 is an enlarged vertical sectional view taken through the line 14—14 of Fig. 2, and looking in the direction of the arrows; Fig. 15 is a plan view of the portion of the apparatus shown in Fig. 14; Fig. 16 is a fragmentary plan view illustrating a certain air pressure cleaning system used in this apparatus; Fig. 17 is a side elevation view of a portion of the air pressure cleaning system shown in Fig. 16; Fig. 18 is a fragmentary horizontal sectional view taken through the line 18—18 of Fig. 3 and looking in the direction of the arrows; Fig. 19 is a perspective view of a cam mechanism used in the control of this apparatus; Fig. 20 is a development of the cam mechanism of Fig. 19; Fig. 21 is an enlarged vertical sectional view of a portion of the testing apparatus shown in Fig. 1; Fig. 22 is an enlarged end view taken along the line 22—22 of Fig. 21 with parts removed, and looking in the direction of the arrows; Fig. 23 is an enlarged sectional view taken through the line 23—23 of Fig. 21, and looking in the direction of the arrows; Fig. 24 is an enlarged end view taken along the line 24—24 of Fig. 21 with parts removed, and looking in the direction of the arrows; Fig. 25 is an enlarged plan view of that portion of the apparatus of Fig. 21 taken along the line 25—25, the casing of Fig. 21 being removed in Fig. 25; Fig. 26 is an enlarged side elevation of a portion of Fig. 1 looking from the left-hand side of that figure; Fig. 27 is an enlarged side elevation of the core visual inspection apparatus shown in Fig. 1, the view being taken from the left-hand side of that figure; Fig. 28 is a vertical sectional view taken through the line 28—28 of Fig. 27 and looking in the direction of the arrows; and Fig. 29 is a diagrammatic illustration of an electrical control system for the core testing apparatus.

Referring to the drawings, this invention has been shown in one form as applied to apparatus for gauging the cores 1 of automatic machine gun bullets. As shown in Figs. 3, 4, 5, 7, 8, 25, 27 and 28, the cores 1 are provided with an ogive end 2, a central body section 3 and a boat-tail end 4 which terminates in a flat surface 4a. The function of this apparatus is to gauge the ogive and boat-tail ends 2 and 4, and also the diameters of the body sections 3 of the cores. The apparatus further functions to separate the imperfect cores, dividing them in accordance with the imperfections.

Referring more particularly to Figs. 2, 3, 4 and 5, the apparatus comprises an indexing plate 5 into which the cores 1 are fed and which plate is rotated in a step-by-step motion in a counter-clockwise direction, as viewed in Figs. 2 and 5, from a loading station to various gauging and discharge stations.

The indexing plate 5 is mounted to rotate upon an upright shaft 6 which is journaled in a suitable bearing 7 mounted upon a casing 8. Located within the casing 8 and secured to the lower end of the shaft 6 is a gear-like indexing wheel 9, which is shown more clearly in Figs. 3 and 18; and the wheel is rotated step-by-step by means of a crank pin 10 positioned upon a shaft 11 and located eccentrically with reference to the wheel, as shown in Fig. 18. The shaft 11 is driven by means of a motor 12 (Fig. 1). The motor 12, as shown, drives a shaft 13 (Fig. 3) located within the casing 8 by means of a belt 14. The shaft 13 has secured thereto a worm 15 which meshes with a worm wheel 16 secured to the shaft 11 so that when the motor is operated the shaft 11 is continuously rotated and as it is continuously rotated it causes the pin 10 to engage successive teeth of the index gear 9 and thereby impart to the shaft 6 and index plate 5 a step-by-step rotary motion. The motor 12, as shown, is mounted upon a platform 17 (Fig. 1) which is supported upon legs 18 which function also to support the casing 8 through the medium of a table 18a.

An indent roller 18b (Fig. 18) is provided to coact with the indents of the index wheel 9 in order to hold the index plate 5 stationary in its spaced positions. This roller 18b is mounted upon a pivoted lever 18c which is biased counter-clockwise by means of a tension spring 18d so that the roller is forced against the gear 9, as clearly shown in Fig. 18.

The cores 1 are fed to the index plate 5 from a suitable feeding hopper 19 (Fig. 1) operated by an electric motor 19a. The cores are dumped into the feeder 19 which is constructed and arranged when operated by its motor to feed the cores into a spiral spring feed chute 20 which directs the cores to the loading station 21 of the plate 5. The hopper 19 is constructed and arranged so that it directs the cores into the chute 20 with the ogive ends directed toward the loading station of the index plate, as more clearly shown in Figs. 3 and 5. The details of construction of the hopper feed mechanism form no part of this invention, and therefore, it is believed to be unnecessary to describe them here in greater detail.

The loading station 21 which receives the cores 1 from the spring chute 20 is mounted upon a rigid relatively massive base plate 22 which is supported from the casing 8 by means of the bearing member 7 provided for the shaft 6, as more clearly shown in Fig. 3. The loading station 21 comprises a post 23 of L-shape (Figs. 3 and 5), one arm being substantially vertical and the other arm being substantially horizontal and overhanging the base 22, as shown in Figs. 3 and 5. The horizontal arm of the post 23 is provided with an aperture 23a through which the cores are fed to the plate 5, and mounted upon the extremity of this arm is a suitable feed controlling mechanism which permits one core only at a time to be fed to the plate 5. As shown more clearly in Fig. 5, the cores 1 fed through the chute 20 are delivered to a tubular member 24. This tubular member has a cut-away section 24a at its lower end and entering this section is a locking jaw 25 provided with an angular section 26 which when the jaw is in its position shown in Fig. 5 engages the ogive end of the core to prevent it from feeding through to the index plate 5. The locking member 25 is biased counterclockwise, as viewed in Fig. 5, to its locking position by means of a tension spring 27. The locking jaw 25 is periodically moved to its releasing position against the bias of the spring 27 by means of a series of spaced apart upright pin-like members 28 arranged in a circle on the plate 5, as shown more clearly in Figs. 2 and 5. The pins 28 are arranged to engage a cam surface 29, projecting toward them from the locking member 25, so as to move the locking member clockwise to release the cores. The portion of each pin which engages the surface 29 has a semi-circular shape, and when a pin has engaged the surface 29 to release a core to permit it to move to the index plate 5 the surface 29 first rides over the arcuate section of the pin to release the jaw 25, and then moves along the diameter of the cut-away part to permit the jaw to return to its core locking position.

When the mechanism has been operated to release a core 1, it drops through the tube 24 and into one of a continuous series of equally spaced substantially circular openings 30 arranged in a circle in the plate 5, and which opening at the time will be in registry with the tube 24. It will be understood that as the plate 5 is rotated step-by-step each time one of the openings 30 is brought under the feeding mechanism the feeding mechanism is operated to permit a core to drop into the particular opening which lies under the feeding mechanism.

Each core as it drops from the feeding mechanism and into one of the openings 30 falls upon an anvil 31 which comprises a pair of spaced-apart jaws 32 supported upon the base plate 22. The jaws 32 are formed of a very hard metal, such as tungsten carbide, and they are provided with inclined faces 33 facing each other, as shown in Figs. 3 and 5, the faces being shaped so that when the ogive end of the core engages them, as shown in Fig. 3, the core does not rebound. The jaws 32 are so positioned that the core is free to move from them when the indexing plate 5 subsequently rotates to move the core from the loading station.

Each core 1 is held within its opening 30 of the index plate 5 by means of a pin 34 (see Figs. 2, 3, 5, 6, 7 and 8—particularly Fig. 6), which pin is mounted to move through a radial opening 35 which extends inwardly through the periphery of the plate 5 into the opening 30. Each pin 34 is mounted upon a lever 36 pivoted to the plate 5, and which is biased counterclockwise, as viewed in Fig. 6, to locking position to hold core 1 by means of a button 37 which is biased outwardly against the lever by means of a compression spring 38. The pins 34 position the cores 1 laterally in the plate 5 against the angular surfaces of V-block inserts 5A of hard metal such as tungsten carbide.

Positioned upon the lever 36 opposite the button 37 is a flag 39 which is pivoted to the lever by means of a pin 40 which is mounted in a U-shaped bracket 41 which in turn is rigidly secured to the lever 36. The flag may be moved upwardly and downwardly through a limited arc of movement determined by upper and lower vertically spaced stop members 42 and 43 (see in particular Figs. 5, 6 and 14). The flag 39 is provided with a transverse tubular section 44 in the two ends of which are mounted plugs 45 and which are biased apart by means of a compression spring 46. These plugs bear against the inner surfaces of the two arms of the U-shaped bracket 41 in order to hold the flag in upper and lower positions against the stops 42 and 43, and in an intermediate "normal" position—straight out from the lever 36.

At the loading station the flag 39 located at that station will be engaged by the circular surface 46a of a release wheel 46b (Figs. 2 and 5a) which operation will hold the lever 36 in position to keep the locking pin 34 out of engagement with the core 1 in the loading station. In other words, when the core 1 is fed in the plate 5 the pin 34 is in its release position so that the core is free to move through the opening 30 into engagement with the anvil 31.

Suitable profile gauging means are provided for determining whether or not the core has a radically improperly shaped boat-tail end surface 4a, or ogive end 2, as the core is being carried from the loading station. For this purpose, there is provided upon the loading post 22 an upper end profile gauge plate 47 (Figs. 3 and 5), the position of which may be adjusted through its screw fastening means 48. If the upper end surface 4a has irregularities, such as a protuberance, the improper extension will engage the profile plate 47 in order to stop the rotary motion of the core, and also that of the index plate 5. This stoppage of the core and of the index plate effects a complete stoppage of the testing apparatus, and this is effected by means of a clutch 49, shown more clearly in Figs. 3 and 13. The index plate 5 whose rotary motion is effected by the clutch 49 is interposed between the shaft 6 and the clutch 49. Stoppage of the plate 5 during its rotary motion functions to operate a switch 50 (Figs. 5 and 29) connected in the control circuit for the driving motors 12 and 19a. The clutch comprises a sleeve 51 which is secured to the shaft 6 through a washer head cap screw 52 threaded in the shaft 6, as shown in Fig. 13, and upon the upper end of which the sleeve 51 is mounted. The lower end of the sleeve 51 abuts against the upper end of the shaft 6 and it is held tightly against it by means of the washer head 53 of the screw 52 so that in effect the sleeve 51 is rigidly attached to the shaft 6. At the lower end of the sleeve 51 there is an outwardly extending circular flange 54 in which are provided a continuous series of spaced openings 55 arranged in a circle. Mounted within these openings are a series of balls 56 which normally are received in a continuous series of spaced openings 57 arranged in a circle in the plate 5. These balls are normally pressed into these openings by means of a compression spring 58 which has its lower end bearing upon a pressure plate 59 which in turn bears upon the balls, as shown in Fig. 13, and which has its upper end bearing against an adjustable pressure nut 60 threaded on the sleeve 51. It will be understood that as long as there is no obstruction to the rotation of the plate 5 the spring 58 will hold the balls in the openings 57 and thereby effect a positive driving connection between the shaft 6 and the plate 5. In view of the foregoing construction, it will be understood that normally the shaft 6, the sleeve 51, the plate 59, the balls 56 and the index plate 5 rotate as a unitary structure. However, if the rotation of the plate 5 is restricted the shaft 6, of course, will continue to rotate and in doing so it will rotate the plate 54 and carry the balls 56 out of the openings 57. When the balls are moved out of the openings they are, of course, cammed upwardly out of the openings 57 and in doing so they carry the plate 59 with them, the spring 58 yielding to permit this movement of the plate 59. This upward movement of the plate 59 functions to actuate the switch 50 to shut down the driving motors 12 and 19a. For this purpose, there is mounted upon the plate 59 a housing 61 normally rotatable with the plate and which has the double function of housing the clutch mechanism, as viewed in Fig. 13, and of actuating a switch operating lever 62. The switch lever 62 is pivotally mounted upon a post 63 which in turn is supported by the base 22 as more clearly shown in Fig. 5. The lower end of this lever, as shown in Fig. 5, controls the switch 50 so that when it is moved counterclockwise it operates to open the switch. The upper end of the switch arm 62 normally is held against the upper end of the housing 61 by means of a spring 64 (Fig. 5).

It will be observed by reference to Fig. 29 that the switch 50 is connected in the control circuit of a motor control contactor 64a which controls the energization of the motors 12 and 19a from a suitable source of electrical supply 64b—providing of course the main switch 64c be closed. When the motors are operating and the switch 50 is opened, the contactor 64a is deenergized and opens. Also controlling this control circuit are manually operable normally-open start and normally-closed stop switch buttons 64d and 64e, and a thermal overload relay indicated by the numeral 64f.

It should be noted here that when the switch 64c is closed and the button 64d depressed an energizing circuit for the relay 64a will be completed through the switch 64c and button 64d between the middle and lower ones of the supply conductors 64b. After this circuit has been completed and the relay closes its contacts to energize the motors 12 and 19a, the buttons 64d may be released, because a holding circuit will have been established for the relay 64a between the middle and lower ones of the supply conductors 64b through the stop button 34e and safety switch 50.

Here it should be noted that a separate manually operable switch 64g is inserted in the circuit to motor 19a.

Assuming that the core 1 is not stopped by profile plate 47, the index plate 5 will carry the core through an ogive end profile plate 65 (Figs. 7 and 12). The profile plate 65 extends upwardly from a collar 66 which is mounted upon the upper end of a support 67 which in turn is mounted upon the casing 8. As shown more clearly in Fig. 7, the ogive end profile plate 65 is provided with surfaces 68; these are taken from a master core, and have the correct shape for the ogive end of the core; and they will permit the core— if it has the proper shape—to just clear their edges as the plate 5 rotates. However, if the ogive end of the core has an improper protuberance, the core will engage the profile plate 65 to prevent rotation of the index plate 5 and operate the clutch 49 in the manner previously described to operate the switch 50 to deenergize the motors 12 and 19a and thereby shut down the machine.

If the apparatus has been stopped either by the upper profile plate 47 or the ogive end profile plate 65, the operator will manually remove the defective core by manually operating the associated lever 36. And when it is desired to restart the machine the operator will depress the start button 64d.

Assuming that the core 1 has passed the boat-tail end profile plate 47 and the ogive profile plate 65 satisfactorily, the core then will be carried to the ogive gauging station 69 which station is shown more clearly in Figs. 2 and 7-12 inclusive.

This station comprises an ogive gauge 70 which has formed therein a socket 71 which has the shape of the ogive end of a master core. This gauge has an exterior hexagonal contour, as shown in Fig. 12, and it is mounted within a nut 72 which is threaded in the upper end of a sleeve 73. The upper end of the nut is provided with an inturned flange 74 against which the upper end of the gauge 70 bears, and against which it is forced by means of a compression spring 75, which spring has its upper end bearing against the lower end of the gauge and its lower end bearing against an abutment plate 76 supported in the sleeve 73.

The gauge 70 is provided with a sector-shaped cut-away section indicated by the numeral 77 and more clearly shown in Fig. 12, which section extends into the vertical center line of the gauge. Mounted upon the nut 72 and extending inwardly into this section are a pair of pins 78 which coact with the surfaces defining the section, as clearly shown in Fig. 12, in order to position the gauge in the nut and to prevent it from rotating therein.

The sleeve 73 reciprocates in the standard or post 67, previously referred to, which, as shown, is in the form of a cylindrical housing.

It is contemplated that when the core 1 is supported at the ogive gauge station, as shown in Fig. 7, the ogive gauge 70 will be elevated so that the socket 71 will be moved to receive the ogive end 2 of the core, as shown in Figs. 8 and 10.

The gauge 70 is elevated by means of a plunger 79 which is operated by means of a cam 80 having a cam race 81 for actuating the plunger; this cam is shown in detail in Fig. 19 and its development is shown in Fig. 20. Mounted on the lower end of the plunger is a cam roller 82 which rides upon the race 81. The roller 82 is held in engagement with the cam surface 81 of the cam 80 by means of the compression spring 79a. The cam 80 is secured to the shaft 11, as shown more clearly in Fig. 3, so as to rotate with this shaft and thereby be rotated by the main operating motor 12. The race 81 is provided with a riser 83 which at the proper portion of the rotation of the cam elevates the gauge 70 and holds it in its gauging elevated position.

The plunger 79 carries a transverse pin 84 which has its ends received in a sleeve 85 so that when the plunger is elevated the sleeve 85 is elevated with it. Interposed between the upper end of the sleeve 85 and a shoulder 86 on the sleeve 73 is a spring 87 which transmits the motion of the sleeve 85 to the sleeve 73 to elevate the gauge. The pin 84 is prevented from rotating relative to the housing 67 by means of an upright cylindrical member 88 (Fig. 10) which has diametrically opposed vertical slots 89 therein (Fig. 9) that receive the heads of the pin to prevent its rotary movement in the housing 67.

Thus, when the core 1 has been moved to the ogive station shown in Fig. 7, the cam 80 will operate to elevate the plunger 79 to move the gauge 70 upwardly so that the ogive end 2 of the core is received in the socket 71. The gauge in thus engaging the core will elevate it somewhat against the force of its holding pin 34. That is, the gauge gauges the core between the points a and b (Fig. 20) of the cam race 83, and from the points b to c there is an overtravel; in other words, as the gauge rises it first completely seats itself about the ogive end of the core, and following this there is a slight overtravel; this overtravel movement is utilized to close the contacts of a master switch 90 (Figs. 7, 8 and 29). This overtravel before the switch 90 is closed is desirable in order to insure that the ogive gauging has been completed mechanically so that no incomplete gauging will be registered. The switch 90 is operated directly to close by means of a plunger 91 which is engaged by the head of the pin 84, as clearly shown in Fig. 8, to move the switch contacts 90 to their closed position.

The closing of the switch 90 closes gauging circuits, as will be described in greater detail hereinafter.

Also located at the ogive gauge station are a pair of micro switches 92 and 93 (Figs. 7, 11 and 29). The switch 92 is normally open, as shown diagrammatically in Fig. 29, while the switch 93 has a movable contact operating between a pair of fixed contacts 94 and 95, the movable contact normally engaging the contact 94. The movable contacts, as shown, are mounted upon switch arms which have depending plungers 96 and 97. These plungers are operated sequentially by means of an operating member 98 having upright protuberances 99 and 100, respectively, for engaging and operating the switch plungers 96 and 97—the plunger 97 first being operated and then the plunger 96. The plate 98, as shown in Fig. 7, is mounted upon flexible spring-like supports 101, which bias it downwardly; the plate is operated upwardly to operate the switches 92 and 93 by means of a pin 102 mounted in a collar 103. The upper end of this pin is provided with a head 104 which normally is biased to engage the underside of the plate 98 by means of a compression spring 105 (Fig. 11). The spring, however, is not sufficiently strong to bias the plate 98 upwardly to operate the switches.

The function of the microswitches 92 and 93 is to electrically gauge the ogive end 2 of the core 1, and this gauging occurs between points b and c on cam race 81. The switches control a pair of electromagnets 106 and 107 respectively (Figs. 14, 15 and 29). These electromagnets are mounted in a housing structure 108 which in turn is mounted upon the upper end of casing 8. The magnets are provided with spring-retracted armatures 109 and 110 respectively. The magnets are located above and below the path of movement of the flags 39, as shown in Fig. 14, and the armatures when the magnets are energized are projected outwardly from the lower and upper ends of the respective magnets so as to engage the flag 39 of the lever 36 which is holding the particular core 1 in the index plate 5 that is in the ogive testing station at the time of the energization of the magnet. That is, when the master switch 90 is closed, the core flag 39 will be tilted either downwardly or upwardly, as viewed in Fig. 14, by either the armature 109 or 110 according to which of the electromagnets 106 or 107 is energized, it being understood that the circuits to the magnets are completed or opened as the case may be by the switches 92 and 93 just prior to the closing of the master switch 90.

Assuming that the ogive end 2 is correct, or falls within allowable tolerances, then when the ogive gauge seats itself over the ogive end of the core and elevates it, the gauge will elevate the core sufficiently far only to operate the switch 93 to open the contact 94 and to close the contact 95; and it will not close the contacts of switch 92. As a result of this, when the master switch 90 closes neither of the magnets 106 or 107 will be energized. Consequently, the horizontal position of the flag 39 is not changed. As long as the ogive end is such that contact 95 is closed and 92 is not closed, the ogive end falls within the range of permissible tolerances. This range may be changed by adjusting the position of the micro switches with relation to operating pins 99 and 100. This is accomplished by thumb screws 110a, the adjustment of which shifts the switch housings 110b which are mounted on flexible bases 110c.

However, should the ogive end 2, because of deviations in contour or other causes, fail to cause either of the plungers 96 or 97 to operate as the ogive gauge elevates, then when the master switch 90 closes, the electromagnet 107 will be energized through switch 90 and the closed contact 94; I will call an ogive end which effects this operation a "short" ogive. The electromagnet 107 when energized causes armature 110 to move the flag 39 upwardly to its dotted line position shown in Fig. 14. On the other hand, should the ogive end 2 be such that both switches 96 and 97 are operated, then the magnet 106 will be energized through the switch 92 when the master switch 90 closes. As a result of this action, armature 109 will operate the flag 39 to its lower dotted line position shown in Fig. 14. An ogive end which causes this operation is called a "long" ogive.

As a result of the foregoing, if it be assumed that the ogive end 2 is too "short" and as a result thereof flag 39 is in its elevated position as shown in Fig. 14, then when the index plate 5 is advanced through its next step of motion the flag will be engaged by a release roller 111 (Figs. 2 and 5a); this roller is provided with a downwardly inclined tapered flange 112 which inclines the flag downwardly and causes it to be engaged by a circular surface 113 on the roller, which operation pivots the lever 36 to release the core 1 from the plate 5. The core which is thus released is fed by means of a spiral discharge chute 114 into a collecting bin 115.

On the other hand, if the ogive end 2 happens to be too "long" then the upper electromagnet 106 will have been energized to depress the flag 39 to its lower position, as viewed in Fig. 14, and it will pass the release roller 111 without interference but will be engaged by a release wheel 116 similar to the wheel 111 but reveresely positioned, as shown in Fig. 5a. The inclined surface 116a of this wheel inclines the flag 39 upwardly against circular surface 116b to release the core from the plate 5. The released core discharges through a chute 117 into a bin 118.

If the ogive end 2 of the core is correct the flag 39 associated with that core will pass both release wheels 111 and 116 without interference along dotted line o—p of Fig. 5a, and the core will then be carried to the boat-tail end gauge station 119.

It will be understood, of course, that prior to the time that the index plate 5 advanced from the ogive gauge station to the station of the release roller 111 the cam 80 will have permitted the plunger 79 to have been retracted and thereby withdraw the ogive gauge 70 from the core. In order to insure that the core is stripped from the ogive end gauge, a stripper bar 120 (Figs. 7 and 12) is provided, which as shown more clearly in Fig. 12, extends into the open sector-shaped section 77 of the gauge 70. An open end clearance slot 72a in the nut 72 opposite the open section 77 of the gauge 70 is provided for the stripper bar 120. Should the core 1 stick in the ogive end socket, it will be engaged by the bar 120 which will prevent its further downward movement and the socket will withdraw from it.

The boat-tail end gauge station electrically gauges the core boat-tail end 4. This station comprises a boat-tail gauge 121 (Figs. 3 and 4) which is provided with a socket 122 having the size and shape of the boat-tail end 4 of a master core. This gauge is secured in a sleeve 123 by means of a nut 124 and the sleeve 123 is mounted upon a standard 125. The standard 125 is mounted upon a rod 126 which moves in a bearing 127 that is mounted upon the casing 8. This rod at its lower end carries a roller 128 which is engaged by a cam race 129 formed on the cam 80. The rod 126 and the standard attached to it are biased against the cam by means of a compression spring 130. A depending key 125a fastened to the lower end of standard 125 is received in a slot 125b of the guide block 125c preventing any turning movement of the standard 125. The cam race 129 is so arranged that when the index plate 5 has been moved to carry a core 1 to a position directly under the socket 122 a depression 131 (Figs. 19 and 20) in the cam will cause the standard 125 to lower in order to bring the boat-tail socket 122 over the boat-tail end 4 of the core. The gauging action takes place between the points indicated d and e (Fig. 20), while there is an overtravel which takes place between the points e and f of the depression.

During the gauging portion of the cam points d and e the socket 122 will move down over the boat-tail end 4. In order to support the core against the force of this movement, there is mounted upon the base plate 22 an anvil 132 which has an incline 133 to cause the core 1 to ride up onto the anvil to its position shown in Fig. 3. Also during this portion of cam travel $d-e$, a pair of electromagnets 134 and 135 are controlled; these are shown diagrammatically in Fig. 29, and have identically the same mechanical construction as the magnets shown in Fig. 14.

It is to be noted here that the ogive gauge socket 71 is moved into engagement with the ogive end 2 of one core located at the ogive gauge station at exactly the same instant of time that the boat-tail gauge socket 122 is moved into engagement with the boat-tail end of another core located at the boat-tail end gauge station; and that the master switch 90 controls the energization of both the ogive and boat-tail end sets of electromagnets 106 and 107, and 134 and 135 respectively.

At the boat-tail end station, microswitches 136 and 137 (Figs. 3 and 29), which are of the same construction as switches 93 and 92 respectively, are operated sequentially in the same fashion as those switches by an operating member 138 which in turn is operated by a pin 139; this pin in turn is operated by a second pin 140 mounted in the boat-tail gauge 121 and projecting into the boat-tail end cavity 122, as shown in Figs. 3 and 4.

Assuming that the boat-tail end 4 of the core is such that when the gauge cavity 122 is lowered about it, the pin 140 will not be elevated sufficiently far to operate either of the switches 136 or 137; then when the master switch 90 subsequently closes, the electromagnet 135 will be energized so as to move the flag 39 of the gauged core upwardly, in the same manner as shown in Fig. 14; such a boat-tail end, I call a "short" end. If the boat-tail end be too "long" then both microswitches 136 and 137 will be operated to their upper positions, as viewed in Fig. 29, and as a result the electromagnet 134 will be energized to depress the flag. If the boat-tail is correct within permissible tolerances only the switch 136 will be operated to its upper position and neither of the electromagnets will be energized. As long as the boat-tail end is such that upper contact of switch 136 is closed and switch 137 is not closed, the end falls within the range of permissible tolerances.

Assuming that the flag 39 is elevated by the magnet 135 due to the fact that the boat-tail end 4 is too "short," then when the indexing plate 5 is moved to its next station the flag will be engaged by a release roller 141, similar to the roller 111, and this roller will operate to release the core from the plate 5, which core will be fed through a discharge chute 142 to a collecting bin 143.

On the other hand, if the flag were depressed because of the fact that the boat-tail end of the core 4 happened to be too "long" then the flag will pass the release roller 141 without interference and will be engaged by a release roller 144, similar to release roller 116, and the core will be released and discharged through a chute 145 into a release bin 146.

If, however, the boat-tail end of the core is correct, then it will pass both release rollers 141 and 144 as the plate 5 advances and it will be engaged by a final release roller 147 which effects the release of the core, and it will discharge through a chute 148. The roller 147 has two inclined surfaces 147a and 147b which confine the flag to engage a circular surface 147c; this surface operates the lever 36 to release the gauged core.

Summing up, if the core 1 is proper as to general profile, and gauges properly as to ogive and boat-tail ends, it will be moved around by the plate 5 to the discharge chute 148. If it is defective, it will be discharged from the plate into the bin assigned to the particular class of defect.

It will be understood, of course, that if at either the ogive station or the boat-tail station no core happens to be present then that station will register the same as it would have registered if the ogive end or the boat-tail end were too short.

In order to insure to the operator that the electromagnets are intermittently operating in the proper fashion, indicating lamps 149 and 150 are provided for and connected in parallel with the electromagnets 106 and 107, respectively, and indicating lamps 151 and 152 are provided for and connected in parallel with the electromagnets 134 and 135, respectively. These lamps blink on and off as their associated magnets are energized and deenergized.

There is provided a cleaning air blast system which directs continuous blasts of air into the gauge sockets 71 and 122 during the periods when the gauges approach and engage the cores. This insures that the core ends are free of foreign particles before the gauges are seated on the cores. This system comprises an air nozzle 153 located at the ogive station so that when the ogive socket 71 is being elevated to its position of Fig. 8, a cleaning blast of air is projected over the ogive end of the core. As shown more clearly in Fig. 16, this nozzle is positioned opposite the opening 77 in the ogive gauge 70 and is registered with the opening 72a in the sleeve 72. At the boat-tail end station an air nozzle 154 is positioned to project air over the boat-tail end of the core as the boat-tail end gauge is lowered, the air entering the nut 124 through an opening 155 and entering the boat-tail end gauge 121 through a sector-shaped opening 156. The air is delivered to the two nozzles by means of a pipe system 157 controlled by a valve 158, which valve is shown more clearly in Fig. 17. The valve 158 normally is closed and is provided with a plunger 159 which when depressed opens the valve and permits air to flow into the pipe system 157 from a supply source 160. The plunger 159 is depressed by a lever 161. This lever, as shown more clearly in Figs. 3 and 17, is located below the standard 125 so that when this standard is lowered simultaneously with the elevation of the ogive gauge, the valve 158 is opened to permit air to flow through both nozzles 153 and 154.

The cores 1 which have successfully passed through the apparatus thus far described and have been delivered to the discharge chute 148 are fed to a classifier which functions to measure the diameters of the body 3 of the cores.

The classifier (Figs. 1, and 21 to 26) comprises a pair of parallel gauging rolls 162 and 163 mounted for rotation in a frame 164 that is supported by the table 18a. These rolls slope downwardly from the central gauging mechanism, as shown in Fig. 1, and they are geared to rotate together by gearing 165; it is contemplated that the rolls will rotate in opposite directions as indicated by the arrows in Fig. 23. One of the rolls is driven by a belt drive 166 from a shaft 166a which is driven from the motor 12 by means of a belt drive 166b, as shown more clearly in Fig. 1. The roll 163 is provided with a pulley 163a for this purpose.

The roll 163 has the same diameter throughout, whereas the roll 162 has three sections of its length with stepped diameters 167, 168 and 169.

Furthermore, as shown more clearly in Fig. 25, the rolls are spaced apart so that the three sections 167, 168 and 169 define with the roll 163 a stepped series of openings 170, 171 and 172 between the two rolls. The cores 1 are delivered by the discharge chute 148 onto the right-hand end of the rolls, as viewed in Figs. 21 and 25. The gauging results are determined according to which of the stepped gauging widths between the rolls that the cores drop through. Cores having under-sized diameters will drop through the space 170, those having correct diameters will drop through the space 171, while those having over-sized diameters will drop through the space 172. Separate chutes 173, 174 and 175 carry the cores from these three sections respectively.

Mounted above the discharge openings 170, 171 and 172 is an elongated flat core confining member 176.

The good cores 1 which have passed the diameter test and which are discharged by the chute 174 are fed to a visual inspection station 177 shown at the left of Fig. 1 and supported by the legs 18 at that side. This mechanism comprises a base plate 178 which is directly secured to the table structure 18, 18a. Rotatably mounted on this base plate is a drum 179. This drum has an outwardly extending flange 180 which, as shown, is provided with a continuous series of closely spaced holes 181 formed therein. The cores delivered by the chute 174 from the classifier are fed to a diagonally positioned loading block 182 mounted on the base plate 178 in close proximity to the periphery of the core drum 179. As the drum 179 is rotated, the cores are delivered from the block 182 into the series of openings 181.

Here it should be noted that the drum is manually rotated.

Located beneath and spaced from the upper semi-circular half of the core drum and in concentric relation with it is a curved strip or track 183 and spaced below the lower part of the drum is a circular strip or track 184 in substantially concentric relation with the drum. These two tracks are fixed.

In the operation of this part of the mechanism, the drum is turned slowly by hand counterclockwise, as indicated by the arrow in Fig. 27. This allows the cores 1 to enter the succeeding openings 181 in the periphery of the drum. The cores, as shown, drop in ogive points first and these points rest against the surface of the track 183. Preferably, and as shown more clearly in Fig. 28, the track 183 will have formed therein a groove 183a to insure proper positioning of the cores. The ogive points slide along the upper track with the boat-tail ends of the cores extending above the outer drum surface, and spread out in fan-like fashion for scanning by the operator. A core whose boat-tail has deep tool marks or other irregularities is removed from the drum by hand.

As shown in Fig. 27, the upper track 183 ends somewhat below the point where the cores assume an approximately horizontal position. As the cores move further in the counterclockwise direction the lower track 184 engages the boat-tail ends of the cores and confines them to move along with the drum. The ogive ends are then uppermost and may be scanned by the operator for irregularities.

Since the ogive ends 2 are longer than the boat-tail ends 4, the curvature of the lower track 184 is formed so as to cam the cores in slightly so as to insure that the entire ogive ends of the cores will be completely exposed for visual inspection.

The lower track 184 terminates diagonally at the lower right as viewed in Fig. 27, at which point there is located a final discharge chute 185. When the cores arrive at the chute they are, of course, no longer supported and drop out of the openings 181 in the drum 179 and into a suitable container (not shown) such as a barrel, fully gauged and visually inspected.

It will be understood that whenever it is desired to stop the apparatus it is merely necessary to depress the stop button 64e.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. Apparatus for testing a bullet core having an ogive end and a boat-tail end comprising a support movable to a series of successive gauging stations and to discharge stations, means on said support for holding a core thereon operable to release position to permit the core to discharge from the support, an ogive end gauge station having an ogive gauge socket, a boat-tail end gauge station having a boat-tail end gauge socket, means for moving said support to said stations, means for operating said gauge sockets onto the ogive and boat-tail ends respectively of a core located in said stations, measuring means operated responsively to the relative movement between said sockets and the ogive and boat-tail ends of said core for measuring said ends, an operating lever for said holding means, a flag on said lever operable to a plurality of positions, means for moving said flag selectively to said positions operated responsively to the operation of said measuring means in accordance with the measurements of said ends, and means at said discharge stations for engaging said flag, depending upon its position, to operate it to move said lever to release said holding means.

2. Apparatus for testing a bullet core having an ogive end and a boat-tail end comprising a rotary plate having therein a series of spaced apertures arranged in a circle for receiving a series of cores, a loading station having means for loading said cores into said apertures, pins entering said apertures for engaging said cores to hold them in said plate, means for operating said pins to release said cores including a flag for each pin projecting from the periphery of said plate and carried around with it as the plate rotates, said flag being mounted for movement from a normal position straight out from said plate to depressed and elevated positions, means for moving said plate in step-by-step motion to a plurality of successive gauging and discharging stations, measuring means at the gauging stations for measuring said ogive and boat-tail ends of said cores, means operated responsively to said measuring means for depressing or elevating said flag or permitting it to remain in its normal position depending upon the measurements of the ogive and boat-tail ends measured by said measuring means, and means at said different ones of said discharge stations for operating said flag to release said pin depending upon whether the flag is depressed or elevated or is in its normal position.

3. Apparatus for testing a bullet core having an ogive end and a boat-tail end comprising a rotary plate having therein a series of spaced apertures arranged in a circle for receiving a series of cores, a loading station having means for loading said cores into said apertures, pins entering said apertures for engaging said cores to hold them in said plate, means for operating said pins to release said cores including a flag for each pin projecting from the periphery of said plate and carried around with it as the plate rotates, said flag being mounted for movement from a normal position straight out from said plate to depressed and elevated positions, means for moving said plate in step-by-step motion to a plurality of successive gauging and discharging stations, measuring means at a first gauge station for measuring said ogive end of said core, means operated by said measuring means for depressing or elevating said flag depending upon the departure of said measurements from standard limits, a pair of discharge stations following said ogive gauge station respectively to engage said flag if it be elevated or depressed to cause release of said core but permitting the flag to move on with the core held in said plate if said ogive measurement fall within said standard limits, measuring means at a following boat-tail end gauge station for measuring said boat-tail end and means operated responsively thereto for depressing or elevating said flag depending upon the departure of said measurement from normal limits, a pair of discharge stations following said boat-tail end station to engage said flag if it be elevated or depressed to cause release of said core but permitting the flag to move on with the core held in said plate if the core length fall within said standard limits, and a final discharge station having means for engaging said flag when in its normal position for effecting the final discharge of said core.

4. Apparatus for testing a bullet core having an ogive end and a boat-tail end comprising a support for holding a core and moving it to ogive end and boat-tail end gauging stations, power means for operating said support to said stations, means at said stations for measuring said ogive and boat-tail ends respectively, profile gauge plates preceding said ogive and boat-tail gauge stations for gauging portions of the profile of said core, and means for stopping said power means operated responsively to the interengagement of any of the portions of the profile gauge plates with said core which interengagement tends to prevent further movement of said support.

5. Apparatus for testing a bullet core having an ogive end and a boat-tail end comprising a support for holding a core and moving it to ogive end and boat-tail end gauging stations, power means for operating said support to said stations, means at said stations for measuring said ogive and boat-tail ends respectively, a profile gauge plate preceding said ogive and boat-tail end gauge stations for gauging the profile of the flat end surface of said boat-tail end, an ogive gauge plate also preceding said ogive and boat-tail end gauge stations for gauging the profile of said ogive end of said core, and means for stopping said power means operated responsively to the interengagement of any part of either of said profile gauge plates with said core.

6. Apparatus for testing a bullet core having an ogive end and a boat-tail end comprising a gauge station at which one of the ends of said core is measured, a support for holding said core of said station, a gauge socket at said station, means for moving said socket to seat itself on said end, means operated responsively to the movement of said end with said socket for measuring said end, holding means on said support including an operating flag movable with said support in a normal plane of movement and movable up and down therefrom to elevated and depressed positions with respect to said plane of movement, said flag also when operated to a predetermined position with reference to said support effecting the release of said core, a pair of electromagnets positioned above and below said plane of movement of said flag and having armatures movable to depress or elevate said flag depending upon which of said electromagnets is energized, switch means operated responsively to the seating of said socket on said end controlling the energization of said electromagnets so that one is energized in the event the end measurement is greater than a standard range and the other when the measurement is less than said standard range, and a pair of discharge stations following said gauge station, one having means for engaging said flag when it is elevated and the other having means for engaging it when it is depressed and each of the means when engaging said flag moving it to said predetermined position with reference to said support to effect the discharge of said core, but neither of said means at either of said discharge stations engaging said flag when it is in said normal plane whereby the core passes said discharge stations.

7. Apparatus for testing a bullet core having an ogive end and a boat-tail end, comprising a circular rotary plate provided with a series of apertures therein arranged in a circle, said apertures being adapted to receive said cores, a loading station for feeding said cores into said apertures, core holding pins extending radially into said apertures from the periphery of said plate, a lever supporting each of said pins and a spring biasing said lever so that each pin is moved into the aperture to a core holding position, a flag on said lever projecting outwardly therefrom so as to normally lie in the plane of movement of said plate, means for moving said plate in a step-by-step motion from said loading station to successive gauging and discharging stations, the first of said stations constituting an ogive end gauge station, an ogive master socket at said ogive end station, means for moving said socket to seat itself about the ogive end of the core held in said station and for further moving the core with a predetermined overtravel, means operated responsively to the movement of said core by said socket for gauging said ogive end of said core, a following boat-tail end gauge station having therein a boat-tail end master socket, means for moving said boat-tail end socket simultaneously with the movement of said ogive end socket for causing the boat-tail end socket to seat upon the boat-tail end of said core to gauge said boat-tail end, a pair of discharge stations interposed between said ogive end and said boat-tail end stations, a pair of discharge stations following said boat-tail end station, means operated responsively to the movement of said sockets for elevating or depressing said flag if the measurement of the ends gauged fall beyond the limits of a desired determined range of measurements, means at said discharge stations for selectively engaging said flag, depending upon its elevated or depressed position for effecting the discharge of the core from said plate, but said means passing said flag if it is in its normal plane of movement, and a final discharge station for engaging said flag when in its normal plane of movement for effecting the discharge of a core which has successfully passed said ogive end and boat-tail end gauge stations.

8. Apparatus for testing a bullet core having an ogive end and a boat-tail end comprising a support movable to successive ogive end and boat-tail end gauging stations and also to core releasing stations, means on said support for holding a core thereon operable to a release position to permit the discharge of the core from the support, gauge means at said gauging stations for gauging said ogive and boat-tail ends respectively, a control member movable with said support for controlling the operation of said holding means, said control member movable to a plurality of controlling positions with reference to said support, means for moving said member selectively to said positions operated responsively to the operation of said gauging means in accordance with the measurements of said ends, and means at said core releasing stations for releasing said member, depending upon its position, to operate it so as to control said holding means to operate to said release position.

9. Apparatus for testing a bullet core having an ogive end and a boat-tail end comprising a support movable to a series of successive gauging stations and to discharge stations, means on said support for holding a core thereon operable to a release position to permit the core to discharge from the support, an ogive end gauge station having an ogive gauge socket, a boat-tail end gauge station having a boat-tail end gauge socket, means for moving said support to said stations, means for operating said gauge sockets onto the ogive and boat-tail ends respectively of a core located in said stations, measuring means operated responsively to the relative movement between said sockets and the ogive and boat-tail ends of said core for measuring said ends, a movable member for said holding means, a flag on said member operable to a plurality of positions, means for moving said flag selectively to said positions operated responsively to the operation of said measuring means in accordance with the measurements of said ends, and means at said discharge stations for engaging said flag, depending upon its position, to operate it to move said lever to release said holding means.

10. Apparatus for testing a bullet core having an ogive end and a boat-tail end comprising a support for holding a core and moving it, power means for operating said support to move it, profile gauge plates for gauging the profiles to said ogive end and said boat-tail end as said support is moved to carry the core past said plates, and means for stopping said power means responsively to the interengagement of any of the portions of the profile gauge plates with said core ends which interengagement tends to prevent further movement of said support.

STERLING A. OAKLEY.

REFERENCES CITED

The following references are of record in the file of this patent:

UNITED STATES PATENTS

| Number | Name | Date |
| --- | --- | --- |
| 1,406,193 | Kent | Feb. 14, 1922 |
| 1,586,156 | Keller | May 25, 1926 |
| 1,676,879 | Wallin | July 10, 1928 |
| 208,903 | Gill | Oct. 15, 1878 |